United States Patent
Frisch et al.

(10) Patent No.: US 10,318,688 B2
(45) Date of Patent: Jun. 11, 2019

(54) BUILD SYNTHESIZED SOFT ARRAYS

(71) Applicant: INTERNATIONAL BUSINESS MACHINES CORPORATION, Armonk, NY (US)

(72) Inventors: Albert Frisch, Boeblingen (DE); Thomas Kalla, Boeblingen (DE); Juergen Pille, Boeblingen (DE); Philipp Salz, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 15/469,747

(22) Filed: Mar. 27, 2017

(65) Prior Publication Data

US 2018/0068043 A1     Mar. 8, 2018

(30) Foreign Application Priority Data

Sep. 7, 2016 (GB) .................................. 1615170.6

(51) Int. Cl.
*G06F 17/50* (2006.01)

(52) U.S. Cl.
CPC ...... *G06F 17/5054* (2013.01); *G06F 17/5072* (2013.01); *G06F 17/5077* (2013.01); *G06F 2217/12* (2013.01)

(58) Field of Classification Search
CPC .......................... G06F 17/5054; G06F 17/5072
USPC ........................................................ 716/103
See application file for complete search history.

(56) References Cited

U.S. PATENT DOCUMENTS

| | | | | |
|---|---|---|---|---|
| 5,331,593 | A * | 7/1994 | Merritt ................. | G11C 7/1051 365/189.05 |
| 5,649,176 | A * | 7/1997 | Selvidge ................. | G06F 1/04 713/400 |
| 8,375,345 | B1 | 2/2013 | Barowski et al. | |
| 2004/0125684 | A1* | 7/2004 | Takahashi ........... | G11C 11/4087 365/232 |
| 2009/0091399 | A1* | 4/2009 | Wong ..................... | H03K 3/017 331/57 |
| 2011/0029941 | A1* | 2/2011 | Dimou ................. | G06F 17/505 716/101 |
| 2014/0177354 | A1* | 6/2014 | Gupta ..................... | G11C 7/00 365/189.15 |
| 2014/0359209 | A1* | 12/2014 | Perner ................... | G11C 19/28 711/106 |
| 2014/0359546 | A1 | 12/2014 | Chan et al. | |

(Continued)

*Primary Examiner* — Suchin Parihar
(74) *Attorney, Agent, or Firm* — Steven Chiu, Esq.; Blanche E. Schiller, Esq.; Heslin Rothenberg Farley & Mesiti P.C.

(57) ABSTRACT

Generating design data for manufacturing a logic array of a semiconductor circuit from specification data describing the logic array. The specification is transformed into structured specification data including objects corresponding to circuit cells of a first type and logic specification data specifying the logic circuitry to be included in the logic array, and into structure data including placing and routing information concerning the circuit cells of the first type. A determination is made of circuit cells of a second type from the logic specification data. The circuit cells of the first type are pre-placed and routed based on the structure data. The circuit cells of second type are automatically placed and routed.

20 Claims, 2 Drawing Sheets

(56) References Cited

U.S. PATENT DOCUMENTS

2015/0348619 A1* 12/2015 Moschiano ......... G11C 11/5642
714/764

* cited by examiner

BUILD SYNTHESIZED SOFT ARRAYS

PRIOR FOREIGN APPLICATION

This application claims priority from United Kingdom patent application number 1615170.6, filed Sep. 7, 2016, which is hereby incorporated herein by reference in its entirety.

BACKGROUND

One or more aspects relate to logic arrays of a semiconductor circuit.

Typically, logic arrays of a semiconductor circuit may be implemented using pre-designed semiconductor intellectual property cores, also called "IP cores" or "embedded IP", which are difficult to adapt to application needs. For example, they may not be directly available for every size of a logic array or may use different storage elements than required. Smaller array structures may also be synthesized using standard cell components. For example, smaller arrays having 8×8 entries may be used that use standard cell components, e.g., latches and logic gates. However, during placing and routing of these smaller arrays, all the standard constraints, e.g., concerning distances and insulation between standard cell components have to be observed leading to increased area consumption.

SUMMARY

Shortcomings of the prior art are overcome and additional advantages are provided through the provision of a method of generating design data for manufacturing a logic array of a semiconductor circuit from specification data describing the logic array. The method includes, for instance, transforming the specification into structured specification data including objects corresponding to circuit cells of a first type and logic specification data specifying the logic circuitry to be included in the logic array, and into structure data including placing and routing information concerning the circuit cells of the first type. Circuit cells of a second type are determined from the logic specification data. Circuit cells of the first type are pre-placed and routed based on the structure data. The circuit cells of the second type are automatically placed and routed.

Computer program products and systems relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

In the following.

DETAILED DESCRIPTION

Described herein is one example of a more flexible method for generating design data describing a logic array of a semiconductor circuit.

Figure 1:
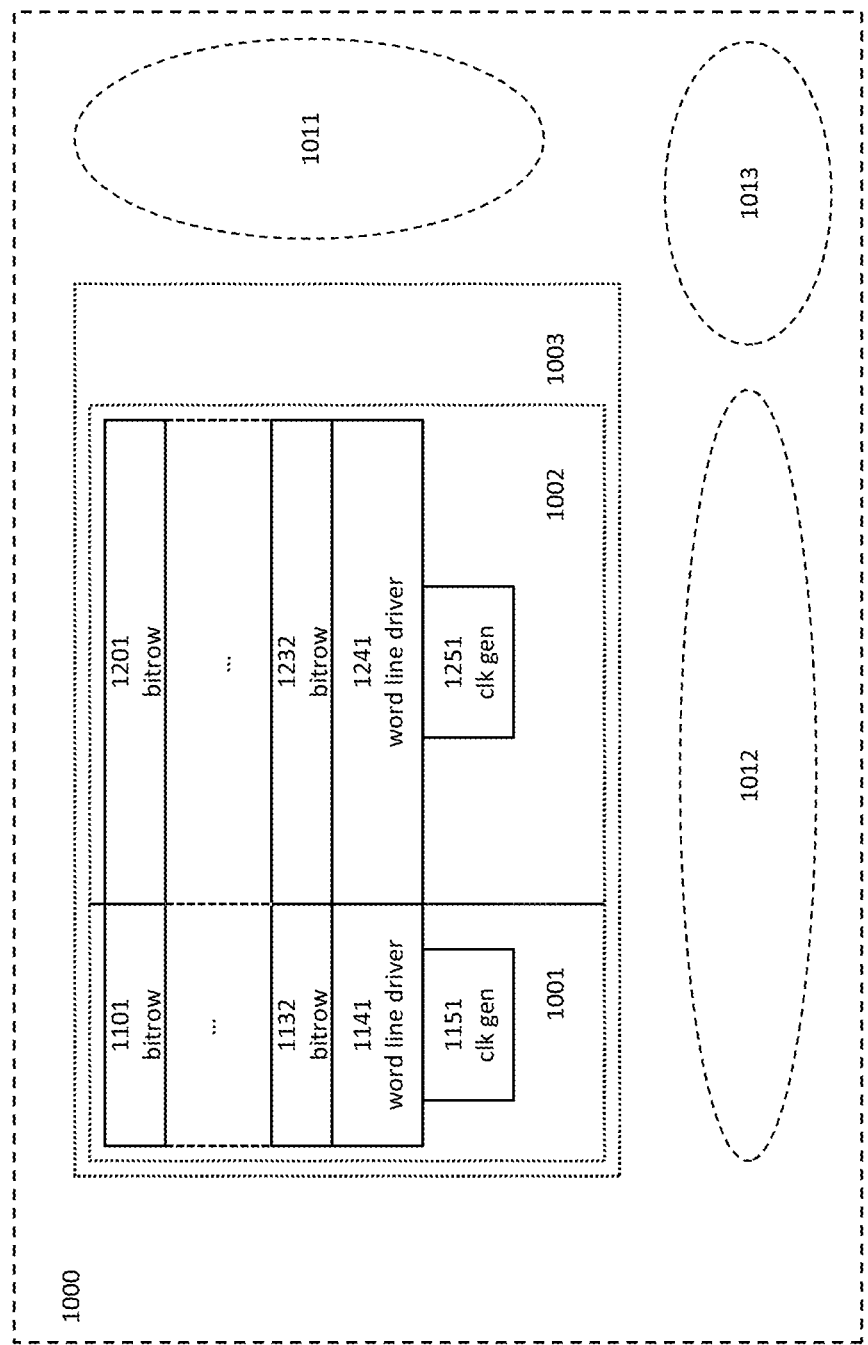
FIG. 1 illustrates one example method for generating design data describing a logic array of a semiconductor circuit.

FIG. 1 shows, in schematic form, design data for a logic array 1000 comprising two core groups 1001 and 1002, e.g., array core groups, each comprising circuit cells 1101, . . . , 1132, 1141, 1151 and 1201, . . . , 1232, 1241, 1251, respectively, of a first type, e.g., array core components, and three units 1011, 1012, 1013 including circuit cells of the second type.

Circuit cells of a first type may include bit rows, word line drivers and clock generators.

Each type of bit row may have a certain number of entries, e.g., 4, 8 or 16 entries, in which each entry corresponds to 1, 2 or 4 (scanable or non-scanable) storage cells. The storage cells may be SRAM cells, regfile cells or latches. The storage cell may have dedicated read and write ports or may be adapted to be read and written through the same ports. The storage cells may be scanable or non-scanable. The bit rows may comprise dynamic (domino) or static read ports and static write ports. Each bit row may be area/density optimized and neighboring storage cells may share elements. The bit rows may comprise a cell for converting a dynamic signal to a static signal. The cell for converting a dynamic signal to a static signal may allow for exchanging signals with cells of the second type. The dynamic signals may be captured by a storing circuitry, in particular, a set/reset latch or a flip-flop circuitry. The cell for converting a dynamic signal to a static signal may comprise two cross-coupled NAND-gates and/or two cross-coupled NOR-gates.

The word line drivers may comprise a number of entries corresponding to the number of entries of associated bit rows. Using dedicated word line drivers may facilitate phasing in the clocks, which may prove to be difficult to implement using synthesis of standard cell components. The word line drivers may provide clocked signals for reading and writing, e.g., read word line signals, pre-charge signal, write word line signals. Each bit row may be area/density optimized and neighboring cells may share elements.

The clock generator may generate the clock used for addressing, writing and reading the entries of the bit rows. The clock generator may be provided as a separate circuit cell of the first type. However, it is also possible to include the clock generator within the word line driver.

In the example embodiment of FIG. 1, the array core group 1001 comprises 32 bit rows 1101, . . . , 1132. Each bit row has 8 entries with 2 bit cells. Thus, the array core group 1001 may be considered as consisting of 8 words of 32 entries. The clock generator 1151 generates the clock for the word line driver 1141. The word line driver 1141 is adapted to generate the signals for reading and writing the 32 bit rows 1101, . . . , 1132.

The array core group 1002 comprises 32 bit rows 1201, . . . , 1232. Each bit row has 16 entries with 2 bit cells. Thus, the array core group may be considered as consisting of 16 words of 32 entries. The clock generator 1251 generates the clock for the word line driver 1241. The word line driver 1241 is adapted to generate the signals for reading and writing the 32 bit rows 1201, . . . , 1232.

The two array core groups 1001 and 1002 together may be considered as a logic array consisting of 24 words of 32 entries. Neighboring circuit cells of the first type, e.g., the bit rows 1101 and 1102 and/or the bit rows 1101 and 1201 and/or the word line drivers 1141 and 1241, may be designed and placed so that sink pins align.

The total array size in number of bit cells may be limited by the loads on clocked signals like read word line signals, pre-charge/write clocks or write word line signals. Sharing of sink contacts of neighboring cells in bit rows may minimize the load and allow for large arrays.

The logic array 1000 may comprise a dynamic circuit domain including the circuit cells of the first type, wherein the dynamic circuit domain comprises at least one dynamic signal. The term "dynamic signal" may denote that this signal is valid during a certain clock phase only.

Figure 2:
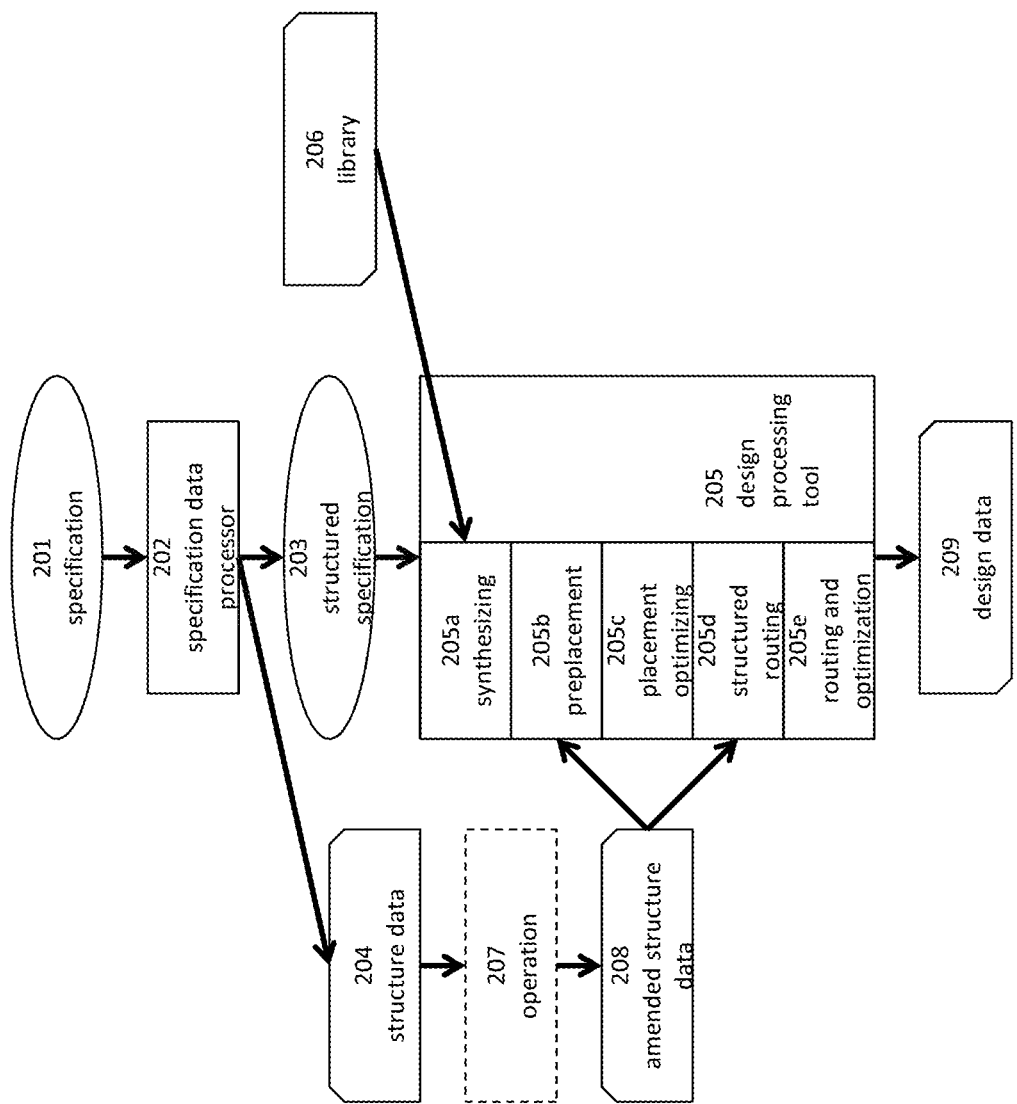
FIG. 2 shows a logic array comprising circuit cells of a first type.

FIG. 2 illustrates a method for generating design data 209 for manufacturing a logic array of semiconductor circuits from specification data 201 describing the logic array. The logic array may include a number of storage elements, for example, a number of words each having particular bit width, a number of read/write ports, specific physical characteristics, input staging, etc.

The specification data 201 may correspond to a description of the logic array in VHDL (VHSIC Hardware Description Language, Very High Speed Integrated Circuit Hardware Description Language). For example, the specification data 201 may describe an array 1003 consisting of 24 words of 32 entries.

In a first processing step, the specification data 201 transformed using a specification data processor 202, on the one hand, into structured specification data 203 comprising objects corresponding to circuit cells of a first type and logic specification data specifying the logic circuitry to be included in the logic array and, on the other hand, into structure data 204 comprising placing and routing information concerning the circuit cells of the first type. The structured specification data 203 may be an alternative description in VHDL. For example, the circuit cells of the first type, which objects are included in the specification data 203, may be 32 bit rows with 16 entries (1201, . . . , 1232), 32 bit rows with 8 entries (1101, . . . , 1132), one word line driver for bit rows with 16 entries (1241) and one word line driver for bit rows with 8 entries (1141) and two clock drivers (1151, 1251). The logic specification data may, in particular, relate to the input/output-circuitry of the logic array, control logic of the logic array and/or the decoder logic of the logic array.

In a next step, the design data 209 is generated using a design processing tool 205. The design processing tool 205 may be a commercially available tool like Cadence FE or Synopsis IC Compiler. The circuit cells of the first type to be included in the design data are directly selected from a library 206 and circuit cells of a second type are determined from the logic specification data and selected from the library 206 in a first sub-step 205*a*. Determining circuit cells of a second type from the logic specification data may also be called synthesizing the circuit cells of the second type. The library may also be called a building block library. The library 206 may allow for reusing optimized circuit cells of the first type and optimized circuit cells of the second type. In case a particular circuit cell of the first type is used very often, even small optimizations may result in many improved logic arrays. The circuit cells of the first type may meet the same requirements as the circuit cells of the second type. The circuit cells of the second type may be considered as standard cells. In particular, the circuit cells of the first type may have the same placement image. The circuit cells of the first type may have the same height limit. The circuit cells of the first type may comply with a standard power image. The circuit cells of the first type may have the same ceiling like circuit cells of the second type. The ceiling may correspond to the second metal layer. The circuit cells of the first type may comply with the same rules as the circuit cells of the second type as far as power and/or noise and/or timing are concerned.

Further, in sub-step 205*b*, the circuit cells of the first type are pre-placed in response to the structure data 208. The structure data 208 may be identical to the structure data 204 derived from the specification data processor 202. Optionally, the structure data 208 may be an amended form of the structure data 204 by a manual and/or automatic operation 207. The structure data 204 may, for example, specify that a word line driver is not to be placed between a group of bit rows but on one of the lateral sides of the group of bit rows. The amended structure data 208 then may further specify that the word line driver is to be placed below the group of bit rows. After pre-placement in sub-step 205*b*, the design processing tool may optimize placement of the circuit cells of the second type using standard algorithms of the design processing tool 205 during a placement and optimization step 205*c*. Moreover, the placement of the circuit cells of the first type may be optimized taking into account the constraints imposed by the amended structure data 208 in sub-step 205*b*.

With respect to the logic array 1000 of FIG. 1, for example, the structure data 208 may impose that the elements of the array core group 1001 may not change their respective position and that the elements of the array core group 1002 may not change their respective position, but that the array core groups 1001 and 1002 may change their absolute position and/or their position with respect to each other. In a further sub-step 205*d*, structured routing of the circuit cells of the first type may be performed based on the structured data 208. Structures routing may include wiring by abutment of circuit cells of the first type. After structured routing of the circuit cells of the first type, normal routing of the circuit cells of the second type and optimization may be performed in step 205*e* to finally obtain the design data 209. Generating the design data 209 may be an iterative process. For example, during routing it may turn out that some circuit cells of the second type have not been placed in an optimal way. Hence, they may be replaced and the remaining process steps may be repeated.

As described herein, in one aspect, a method for generating design data for manufacturing a logic array of a semiconductor circuit from specification data describing the logic array is provided. The method comprises transforming the specification into structured specification data comprising objects corresponding to circuit cells of a first type and logic specification data specifying the logic circuitry to be included in the logic array, and structure data comprising placing and routing information concerning the circuit cells of the first type; determining circuit cells of a second type from the logic specification data; pre-placing the circuit cells of the first type based on the structure data; routing the circuit cells of the first type based on the structure data; automatic placing of the circuit cells of the second type; and automatic routing of the circuit cells of the second type. In addition, the method may optionally include pre-placement of circuit cells of the second type. This may ensure proper timing of critical logic paths. Critical logic paths may include connections between an address decoding unit and a word line driver.

In one embodiment, the method comprises generating a dynamic circuit domain of the logic array including the circuit cells of the first type, the dynamic circuit domain comprising at least one dynamic signal connecting circuit cells of the dynamic domain with each other; and a static circuit domain including the circuit cells of the second type, the static circuit domain being free of dynamic signals.

A further embodiment of the method prescribes that the circuit cells of the first type are placed and routed such that signals interfacing the dynamic circuit domain with the static domain are static signals.

According to another embodiment of the method, the circuit cells of the first type include at least one of: a cell for converting a static signal into a corresponding dynamic signal, e.g., clock gating circuitry; a dynamic cell that requires at least one dynamic input signal and/or generates at least one dynamic output signal; or a cell for converting a dynamic signal to a respective static signal.

Further, in one embodiment, the cell for converting a dynamic signal to a respective static signal comprises at least two cross-coupled NAND-gates.

According to one embodiment, the cell for converting a dynamic signal to a respective static signal comprises storage circuitry. The storage circuitry may comprise a set/reset latch or flip flop circuitry.

Additionally, one embodiment provides that the cell for converting a dynamic signal to a respective static signal comprises at least two cross-coupled NOR-gates.

In another embodiment, the circuit cells of the second type include a cell comprising a predefined primitive static logic operation, e.g., a static logic gate or a combination of multiple static logic gates.

A still further embodiment prescribes that the circuit cells of the first type include at least one of a bit row, a word line driver and a clock generator.

Further, in an embodiment, pre-placing and routing the circuit cells of the first type based on the structure data comprises placing a word line driver, placing and routing a plurality of bit rows in response to the position of the word line driver.

According to another embodiment, a computer program product, e.g., a computer readable storage medium is provided. The computer program product may comprise program code that is programmed for executing a method when run on a programmable computer. The computer program product may be made available for download over a communication network such as the Internet.

Aspects of the present invention may comprise a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating design data for manufacturing a logic array of a semiconductor circuit from specification data describing the logic array, the method comprising:
    transforming the specification into structured specification data comprising objects corresponding to circuit cells of a first type and logic specification data specifying the logic circuitry to be included in the logic array, and into structure data comprising placing and routing information concerning the circuit cells of the first type;
    providing the structured specification data and the structure data to a design processing tool;
    determining, by the design processing tool, circuit cells of a second type from the logic specification data;
    pre-placing, by the design processing tool, the circuit cells of the first type based on the structure data;
    routing, by the design processing tool, the circuit cells of the first type based on the structure data;
    automatically placing, by the design processing tool, the circuit cells of the second type;
    automatically routing, by the design processing tool, the circuit cells of the second type;
    generating, by the design processing tool, design data for manufacturing a synchronous logic array of a semiconductor circuit, resulting in generated design data; and
    manufacturing the synchronous logic array of the semiconductor circuit using the generated design data.

2. The method according to claim 1, further comprising:
    generating, by the design processing tool, a dynamic circuit domain of the logic array including the circuit cells of the first type, the dynamic circuit domain comprising at least one dynamic signal connecting circuit cells of the dynamic domain with each other; and
    generating, by the design processing tool, a static circuit domain including the circuit cells of the second type, the static circuit domain being free of dynamic signals.

3. The method according to claim 2, wherein the circuit cells of the first type are placed and routed such that signals interfacing the dynamic circuit domain with the static domain are static signals.

4. The method according to claim 1, wherein the circuit cells of the first type include a cell selected from a group consisting of:
    a cell for converting a static signal into a corresponding dynamic signal;
    a dynamic cell that includes at least one dynamic input signal or generates at least one dynamic output signal; and
    a cell for converting a dynamic signal to a respective static signal.

5. The method according to claim 4, wherein the cell for converting a dynamic signal to a respective static signal comprises storage circuitry.

6. The method according to claim 4, wherein the cell for converting a dynamic signal to a respective static signal comprises at least two cross-coupled NAND-gates.

7. The method according to claim 4, wherein the cell for converting a dynamic signal to a respective static signal comprises at least two cross-coupled NOR-gates.

8. The method according to claim 1, wherein the circuit cells of the second type include a cell comprising a pre-defined primitive static logic operation or a combination of multiple static logic gates.

9. The method according to claim 1, wherein the circuit cells of the first type include at least one selected from a group consisting of: a bit row, a word line driver, and a clock generator.

10. The method according to claim 1, wherein the pre-placing and the routing the circuit cells of the first type based on the structure data comprises:
    placing, by the design processing tool, a word line driver; and
    placing and routing, by the design processing tool, a plurality of bit rows based on to the position of the word line driver.

11. A computer program product for generating design data for manufacturing a logic array of a semiconductor circuit from specification data describing the logic array, the computer program product comprising:
    a computer readable storage medium readable by a processing circuit and storing instructions for performing a method, the processing circuit being part of a design processing tool, the method comprising:
        transforming the specification into structured specification data comprising objects corresponding to circuit cells of a first type and logic specification data specifying the logic circuitry to be included in the logic array, and into structure data comprising placing and routing information concerning the circuit cells of the first type;
        providing the structured specification data and the structure data to the design processing tool;
        determining, by the design processing tool, circuit cells of a second type from the logic specification data;
        pre-placing, by the design processing tool, the circuit cells of the first type based on the structure data;

routing, by the design processing tool, the circuit cells of the first type based on the structure data;
automatically placing, by the design processing tool, the circuit cells of the second type;
automatically routing, by the design processing tool, the circuit cells of the second type;
generating, by the design processing tool, design data for manufacturing a synchronous logic array of a semiconductor circuit, resulting in generated design data; and
manufacturing the synchronous logic array of the semiconductor circuit using the generated design data.

12. The computer program product according to claim 11, wherein the method further comprises:
generating, by the design processing tool, a dynamic circuit domain of the logic array including the circuit cells of the first type, the dynamic circuit domain comprising at least one dynamic signal connecting circuit cells of the dynamic domain with each other; and
generating, by the design processing tool, a static circuit domain including the circuit cells of the second type, the static circuit domain being free of dynamic signals.

13. The computer program product according to claim 11, wherein the circuit cells of the first type include a cell selected from a group consisting of:
a cell for converting a static signal into a corresponding dynamic signal;
a dynamic cell that includes at least one dynamic input signal or generates at least one dynamic output signal; and
a cell for converting a dynamic signal to a respective static signal.

14. The computer program product according to claim 11, wherein the circuit cells of the second type include a cell comprising a predefined primitive static logic operation or a combination of multiple static logic gates.

15. The computer program product according to claim 11, wherein the circuit cells of the first type include at least one selected from a group consisting of: a bit row, a word line driver, and a clock generator.

16. A computer system for generating design data for manufacturing a logic array of a semiconductor circuit from specification data describing the logic array, the computer system comprising:
a design processing tool, comprising a memory and a processor in communication with the memory, wherein the design processing tool is configured to perform a method, said method comprising:
transforming the specification into structured specification data comprising objects corresponding to circuit cells of a first type and logic specification data specifying the logic circuitry to be included in the logic array, and into structure data comprising placing and routing information concerning the circuit cells of the first type;
providing the structured specification data and the structure data to the design processing tool;
determining, by the design processing tool, circuit cells of a second type from the logic specification data;
pre-placing, by the design processing tool, the circuit cells of the first type based on the structure data;
routing, by the design processing tool, the circuit cells of the first type based on the structure data;
automatically placing, by the design processing tool, the circuit cells of the second type;
automatically routing, by the design processing tool, the circuit cells of the second type;
generating, by the design processing tool, design data for manufacturing a synchronous logic array of a semiconductor circuit, resulting in generated design data; and
manufacturing the synchronous logic array of the semiconductor circuit using the generated design data.

17. The computer system according to claim 16, wherein the method further comprises:
generating, by the design processing tool, a dynamic circuit domain of the logic array including the circuit cells of the first type, the dynamic circuit domain comprising at least one dynamic signal connecting circuit cells of the dynamic domain with each other; and
generating, by the design processing tool, a static circuit domain including the circuit cells of the second type, the static circuit domain being free of dynamic signals.

18. The computer system according to claim 16, wherein the circuit cells of the first type include a cell selected from a group consisting of:
a cell for converting a static signal into a corresponding dynamic signal;
a dynamic cell that requires at least one dynamic input signal or generates at least one dynamic output signal; and
a cell for converting a dynamic signal to a respective static signal.

19. The computer system according to claim 16, wherein the circuit cells of the second type include a cell comprising a predefined primitive static logic operation or a combination of multiple static logic gates.

20. The computer system according to claim 16, wherein the circuit cells of the first type include at least one selected from a group consisting of: a bit row, a word line driver and a clock generator.

* * * * *